United States Patent
Aki et al.

(10) Patent No.: US 12,301,278 B2
(45) Date of Patent: May 13, 2025

(54) INDUSTRIAL WIRELESS COMMUNICATION SYSTEM

(71) Applicant: SMC CORPORATION, Chiyoda-ku (JP)

(72) Inventors: Tomohiko Aki, Tsukubamirai (JP); Norimasa Ozaki, Tsukubamirai (JP)

(73) Assignee: SMC CORPORATION, Chiyoda-ku (JP)

( * ) Notice: Subject to any disclaimer, the term of this patent is extended or adjusted under 35 U.S.C. 154(b) by 0 days.

(21) Appl. No.: 18/261,232

(22) PCT Filed: Aug. 20, 2021

(86) PCT No.: PCT/JP2021/030506
§ 371 (c)(1),
(2) Date: Jul. 12, 2023

(87) PCT Pub. No.: WO2022/158015
PCT Pub. Date: Jul. 28, 2022

(65) Prior Publication Data
US 2024/0072842 A1 Feb. 29, 2024

(30) Foreign Application Priority Data
Jan. 25, 2021 (JP) .................. 2021-009661

(51) Int. Cl.
*H04B 1/7143* (2011.01)
*H04W 56/00* (2009.01)

(52) U.S. Cl.
CPC .......... *H04B 1/7143* (2013.01); *H04W 56/00* (2013.01)

(58) Field of Classification Search
CPC ..... H04B 1/7143; H04B 1/713; H04W 56/00; H04W 56/0035; H04W 56/001; H04W 56/0005; H04W 84/20
See application file for complete search history.

(56) References Cited

U.S. PATENT DOCUMENTS

| 5,604,386 A | 2/1997 | Nagai et al. |
| 6,014,406 A | 1/2000 | Shida et al. |

(Continued)

FOREIGN PATENT DOCUMENTS

| AU | 2017202093 A1 | 10/2017 |
| EP | 3 229 412 B1 | 10/2017 |

(Continued)

OTHER PUBLICATIONS

International Search Report mailed on Nov. 22, 2021 in PCT/JP2021/030506 filed on Aug. 20, 2021 (citing references 16-17 therein, 2 pages).

(Continued)

*Primary Examiner* — Jean B Corrielus
(74) *Attorney, Agent, or Firm* — Oblon, McClelland, Maier & Neustadt, L.L.P.

(57) ABSTRACT

In an industrial wireless communication system. a base wireless device has a synchronous connection transmission unit for broadcasting a synchronous connection signal to achieve synchronous connection to a remote wireless device in only a single synchronous connection period which is an integral multiple of a hopping period. The synchronous connection transmission unit sequentially switches communication frequencies for synchronization so as to transmit the synchronous connection signal with a plurality of communication frequencies for synchronization within one hopping period. A synchronous connection reception unit sequentially switches communication frequencies for synchronization with a switching period which is longer than the hopping period and shorter than twice the hopping period, so as to perform a reception wait process for the synchronous connection signal with a plurality of communication frequencies for synchronization.

17 Claims, 10 Drawing Sheets

(56) References Cited

U.S. PATENT DOCUMENTS

| | | | |
|---|---|---|---|
| 6,466,608 B1* | 10/2002 | Hong | H04B 1/7156 |
| | | | 375/E1.037 |
| 2002/0131484 A1* | 9/2002 | Diepstraten | H04W 56/009 |
| | | | 375/222 |
| 2003/0058829 A1* | 3/2003 | Batra | H04B 1/715 |
| | | | 375/E1.035 |
| 2003/0147453 A1* | 8/2003 | Batra | H04B 1/715 |
| | | | 375/E1.035 |
| 2007/0229302 A1 | 10/2007 | Penick et al. | |
| 2009/0204265 A1 | 8/2009 | Hackett | |
| 2011/0306374 A1 | 12/2011 | Hirai | |
| 2017/0289959 A1 | 10/2017 | Aki et al. | |
| 2020/0068516 A1* | 2/2020 | Ma | G05D 1/0094 |
| 2020/0092832 A1 | 3/2020 | Nguyen-Dang | |

FOREIGN PATENT DOCUMENTS

| | | |
|---|---|---|
| JP | 5-73795 A | 3/1993 |
| JP | 2004-282146 A | 10/2004 |
| JP | 5497730 B2 | 5/2014 |
| JP | 2017-188868 A | 10/2017 |
| JP | 6508538 B2 | 5/2019 |
| WO | WO 2016/123208 A1 | 8/2016 |

OTHER PUBLICATIONS

Office Action issued in corresponding Taiwanese Application No. 111102212, dated Mar. 14, 2025, with Machine Translation.

* cited by examiner

FIG. 3

| Time [msec] | Base Wireless Device | 16A | 16B | 16C | 16D | 16E | 16F | 16G | 16H | 16I | 16J | 16K | 16L | 16M | 16N | 16O | 16P |
|---|---|---|---|---|---|---|---|---|---|---|---|---|---|---|---|---|---|
| 0 | f1 | f1 | f3 | f3 | f3 | f3 | f3 | f3 | f2 | f2 | f2 | f2 | f2 | f2 | f1 | f1 | f1 |
| 1 |  | f1 | f1 | f3 | f3 | f3 | f3 | f3 | f3 | f2 | f2 | f2 | f2 | f2 | f2 | f1 | f1 |
| 2 | f2 | f1 | f1 | f1 | f3 | f3 | f3 | f3 | f3 | f3 | f2 | f2 | f2 | f2 | f2 | f2 | f1 |
| 3 |  | f1 | f1 | f1 | f1 | f3 | f3 | f3 | f3 | f3 | f3 | f2 | f2 | f2 | f2 | f2 | f2 |
| 4 | f3 | f1 | f1 | f1 | f1 | f1 | f3 | f3 | f3 | f3 | f3 | f3 | f2 | f2 | f2 | f2 | f2 |
| 5 |  | f1 | f1 | f1 | f1 | f1 | f1 | f3 | f3 | f3 | f3 | f3 | f3 | f2 | f2 | f2 | f2 |
| 6 |  | f2 | f1 | f1 | f1 | f1 | f1 | f1 | f3 | f3 | f3 | f3 | f3 | f3 | f2 | f2 | f2 |
| 7 |  | f2 | f2 | f1 | f1 | f1 | f1 | f1 | f1 | f3 | f3 | f3 | f3 | f3 | f3 | f2 | f2 |
| 8 |  | f2 | f2 | f2 | f1 | f1 | f1 | f1 | f1 | f1 | f3 | f3 | f3 | f3 | f3 | f3 | f2 |
| 9 |  | f2 | f2 | f2 | f2 | f1 | f1 | f1 | f1 | f1 | f1 | f3 | f3 | f3 | f3 | f3 | f3 |
| 10 |  | f2 | f2 | f2 | f2 | f2 | f1 | f1 | f1 | f1 | f1 | f1 | f3 | f3 | f3 | f3 | f3 |
| 11 |  | f2 | f2 | f2 | f2 | f2 | f2 | f1 | f1 | f1 | f1 | f1 | f1 | f3 | f3 | f3 | f3 |
| 12 |  | f3 | f2 | f2 | f2 | f2 | f2 | f2 | f1 | f1 | f1 | f1 | f1 | f1 | f3 | f3 | f3 |
| 13 |  | f3 | f3 | f2 | f2 | f2 | f2 | f2 | f2 | f1 | f1 | f1 | f1 | f1 | f1 | f3 | f3 |
| 14 |  | f3 | f3 | f3 | f2 | f2 | f2 | f2 | f2 | f2 | f1 | f1 | f1 | f1 | f1 | f1 | f3 |
| 15 |  | f3 | f3 | f3 | f3 | f2 | f2 | f2 | f2 | f2 | f2 | f1 | f1 | f1 | f1 | f1 | f1 |
| 16 |  | f3 | f3 | f3 | f3 | f3 | f2 | f2 | f2 | f2 | f2 | f2 | f1 | f1 | f1 | f1 | f1 |
| 17 |  | f3 | f3 | f3 | f3 | f3 | f3 | f2 | f2 | f2 | f2 | f2 | f2 | f1 | f1 | f1 | f1 |
| 18 |  | f1 | f3 | f3 | f3 | f3 | f3 | f3 | f2 | f2 | f2 | f2 | f2 | f2 | f1 | f1 | f1 |
| 19 |  | f1 | f1 | f3 | f3 | f3 | f3 | f3 | f3 | f2 | f2 | f2 | f2 | f2 | f2 | f1 | f1 |
| 20 |  | f1 | f1 | f1 | f3 | f3 | f3 | f3 | f3 | f3 | f2 | f2 | f2 | f2 | f2 | f2 | f1 |
| 250 | f1 | f3 | f3 | f3 | f3 | f3 | f2 | f2 | f2 | f2 | f2 | f2 | f1 | f1 | f1 | f1 | f1 |
| 251 |  | f3 | f3 | f3 | f3 | f3 | f3 | f2 | f2 | f2 | f2 | f2 | f2 | f1 | f1 | f1 | f1 |
| 252 | f2 | f1 | f3 | f3 | f3 | f3 | f3 | f3 | f2 | f2 | f2 | f2 | f2 | f2 | f1 | f1 | f1 |
| 253 |  | f1 | f1 | f3 | f3 | f3 | f3 | f3 | f3 | f2 | f2 | f2 | f2 | f2 | f2 | f1 | f1 |
| 254 | f3 | f1 | f1 | f1 | f3 | f3 | f3 | f3 | f3 | f3 | f2 | f2 | f2 | f2 | f2 | f2 | f1 |
| 500 | f1 | f3 | f3 | f3 | f2 | f2 | f2 | f2 | f2 | f1 | f1 | f1 | f1 | f1 | f1 | f1 | f3 |
| 501 |  | f3 | f3 | f3 | f3 | f2 | f2 | f2 | f2 | f2 | f1 | f1 | f1 | f1 | f1 | f1 | f1 |
| 502 | f2 | f3 | f3 | f3 | f3 | f3 | f2 | f2 | f2 | f2 | f2 | f1 | f1 | f1 | f1 | f1 | f1 |
| 503 |  | f3 | f3 | f3 | f3 | f3 | f3 | f2 | f2 | f2 | f2 | f2 | f1 | f1 | f1 | f1 | f1 |
| 504 | f3 | f1 | f3 | f3 | f3 | f3 | f3 | f3 | f2 | f2 | f2 | f2 | f2 | f1 | f1 | f1 | f1 |

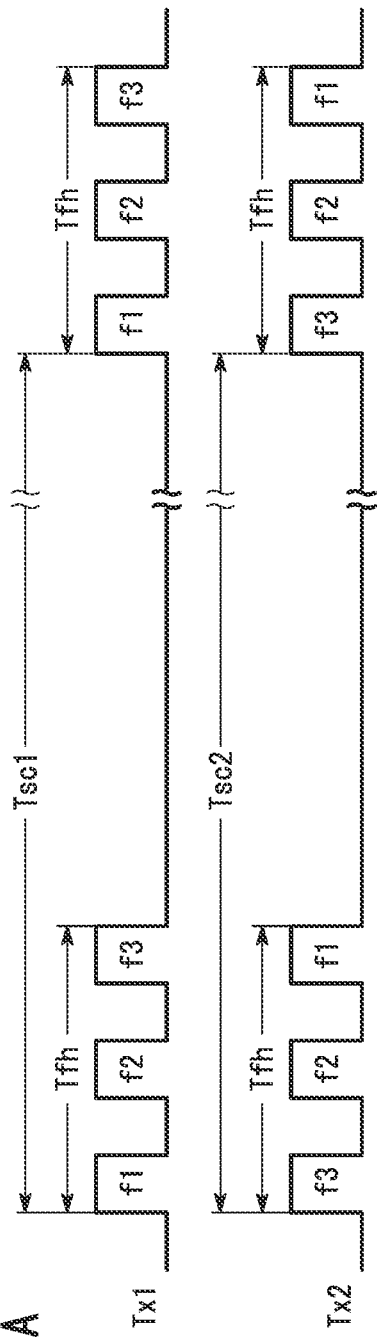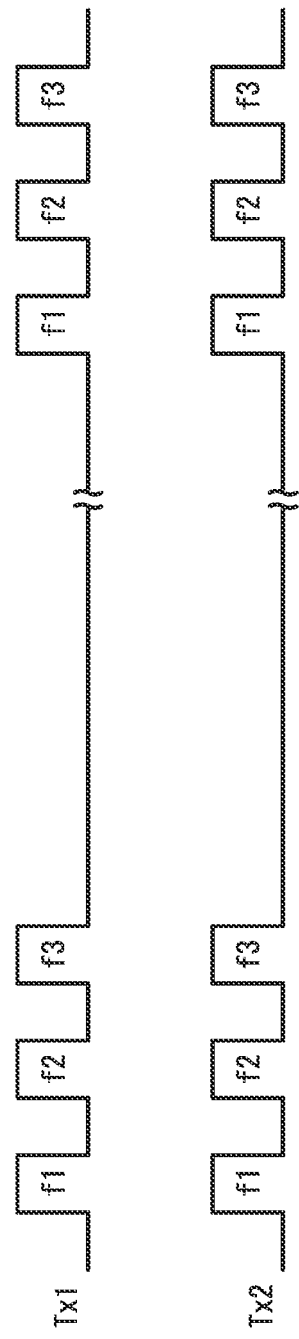

INDUSTRIAL WIRELESS COMMUNICATION SYSTEM

TECHNICAL FIELD

The present invention relates to an industrial wireless communication system.

BACKGROUND ART

In JP 5497730 B2, an FA system is disclosed in which a PC and a controller are connected via a field network, wherein the controller functions as a master device, and wireless messages are sent and received between the master device and a slave device.

SUMMARY OF THE INVENTION

However, such a conventional system is incapable of always establishing a synchronous connection rapidly.

An object of the present invention is to provide an industrial wireless communication system, which is capable of rapidly establishing a synchronous connection.

An industrial wireless communication system according to one aspect of the present invention includes a computer configured to carry out a monitoring control of industrial equipment, a base wireless device connected by a field bus to the computer, and a plurality of remote wireless devices provided in each of a plurality of apparatuses that make up the industrial equipment, and configured to perform wireless communications with the base wireless device, wherein the base wireless device and the remote wireless devices, which are configured to be synchronously connected, switch a hopping frequency at a predetermined hopping period to thereby carry out transmission and reception of data, the base wireless device includes a synchronous connection transmission unit which, in a case that a synchronous connection with any of the remote wireless devices is not established, is configured to carry out a transmission process, by broadcasting, of transmitting a synchronous connection signal for a purpose of synchronous connection with the remote wireless device only at a single sort of synchronous connection period that is an integer multiple of the hopping period, the synchronous connection transmission unit, by sequentially switching communication frequencies for synchronization, which are frequencies used for synchronous communication, transmits the synchronous connection signal at the plurality of communication frequencies for synchronization within one of the hopping periods, and the remote wireless devices each include a synchronous connection reception unit which, in a case that a synchronous connection with the base wireless device is not established, is configured to carry out a process of waiting for reception of the synchronous connection signal at the plurality of communication frequencies for synchronization, and by sequentially switching the communication frequencies for synchronization at a switching period that is longer than the hopping period, and is shorter than a period that is two times the hopping period.

According to the present invention, an industrial wireless communication system can be provided, which is capable of rapidly establishing a synchronous connection.

BRIEF DESCRIPTION OF DRAWINGS

FIG. 3 is a diagram conceptually showing transmission and reception of a synchronous connection signal;

FIG. 5A and FIG. 5B are time charts showing an example of a switching procedure of communication frequencies for synchronization;

DETAILED DESCRIPTION OF THE INVENTION

An industrial wireless communication system according to the present invention will be presented and described in detail below with reference to the accompanying drawings.

Embodiment

Figure 1:
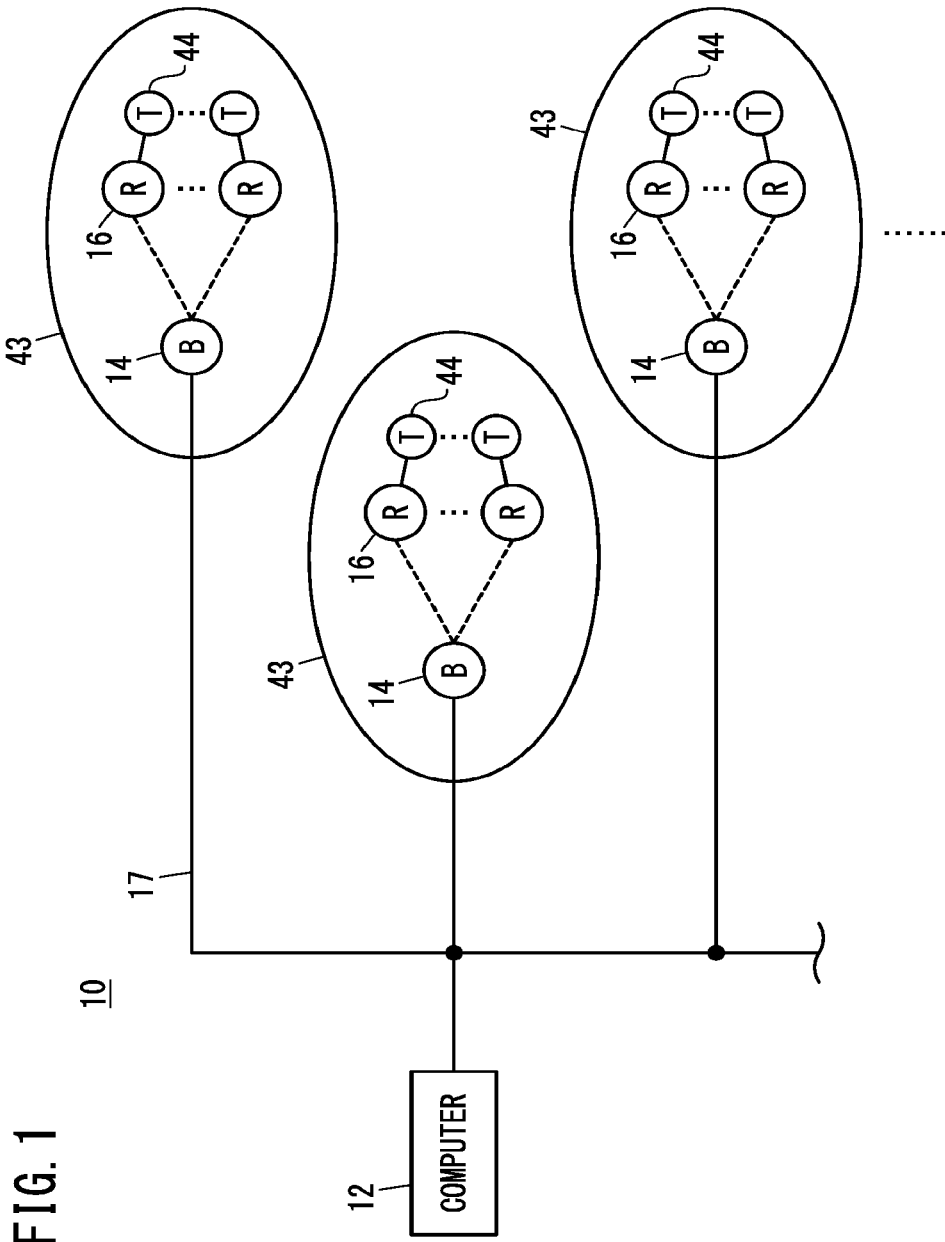
FIG. 1 is a view showing the configuration of an industrial wireless communication system according to an embodiment.
Figure 2:
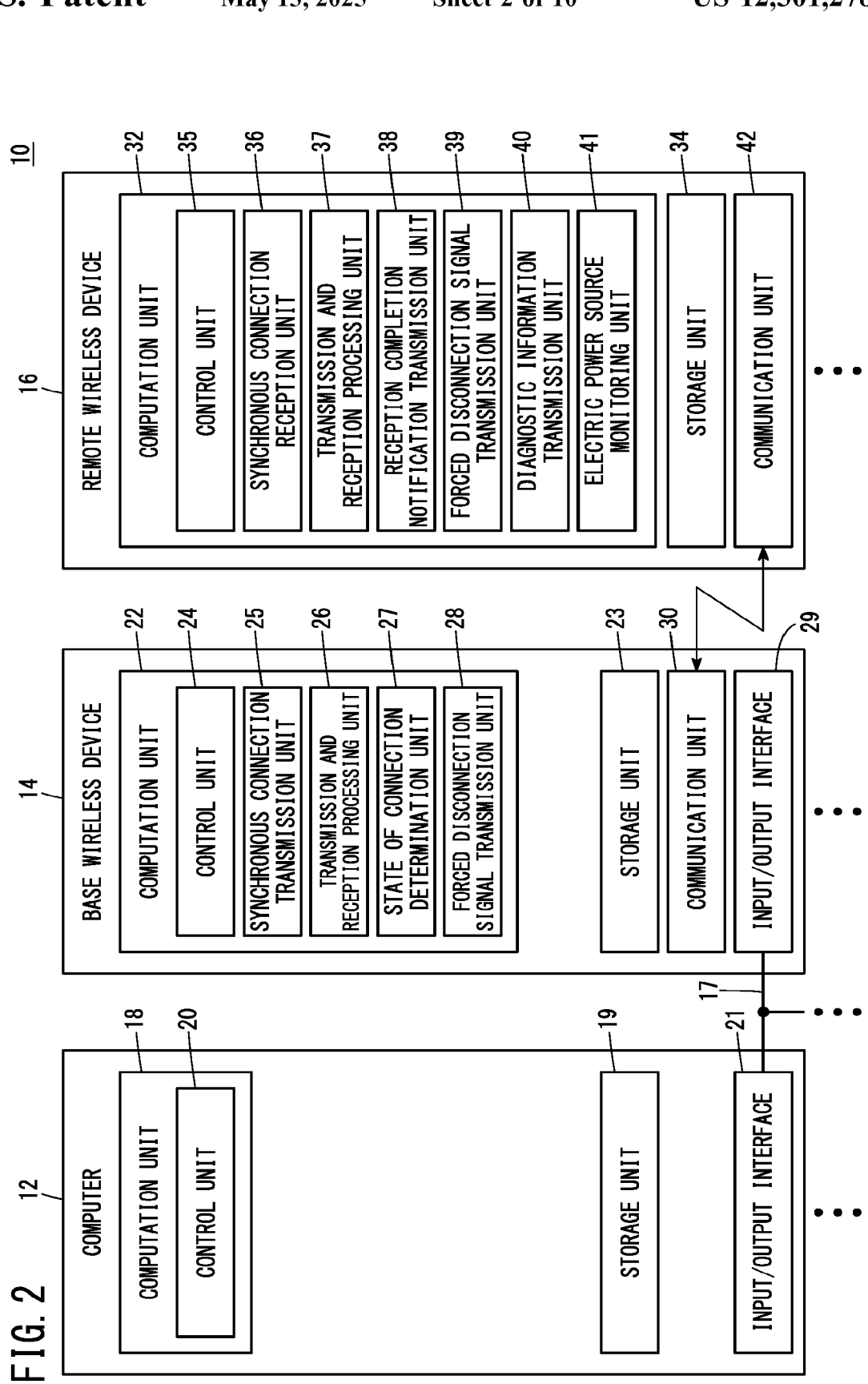
FIG. 2 is a block diagram illustrating the industrial wireless communication system according to the embodiment.

A description will be given with reference to FIGS. 1 to 9 concerning an industrial wireless communication system according to one embodiment. FIG. 1 is a configuration diagram showing the configuration of an industrial wireless communication system according to a present embodiment. FIG. 2 is a block diagram illustrating the industrial wireless communication system according to the present embodiment.

As shown in FIG. 1, an industrial wireless communication system 10 according to the present embodiment includes a computer 12, a base wireless device 14, and a remote wireless device 16. The industrial wireless communication system 10 is equipped with a plurality of the base wireless devices 14. A single computer 12 and the plurality of base wireless devices 14 may be connected via a field bus 17. A plurality of the remote wireless devices 16 may be synchronously connected to one of the base wireless devices 14. A plurality of networks 43 can be configured by synchronously connecting the plurality of remote wireless devices 16 to each of the base wireless devices 14.

The computer 12 may perform a supervisory control (monitoring control) of industrial equipment. Such a computer 12 may be configured, for example, by a PLC (Programmable Logic Controller), however, the present invention is not limited to this feature. As shown in FIG. 2, the computer 12, for example, is equipped with a computation unit 18 (processing unit), and a storage unit 19.

The computation unit 18 may be configured, for example, in the form of a processor such as a CPU (Central Processing Unit) or the like. More specifically, the computation unit 18 can be configured by a processing circuit (processing circuitry). The computation unit 18 is equipped with a control unit 20. Although the computation unit 18 may be equipped with constituent elements apart from the control unit 20, in order to simplify the description, constituent elements other than the control unit 20 have been omitted herein. The control unit 20 administers the control of the computer 12 as a whole. The control unit 20 may perform a supervisory control (monitoring control) of the industrial equipment. The control unit 20 can be realized by programs that are stored in the storage unit 19 being executed by the computation unit 18. Moreover, it should be noted that at least a portion of the control unit 20 may be implemented by an integrated circuit such as an ASIC (Application Specific Integrated Circuit) or an FPGA (Field-Programmable Gate Array). Further, at least a portion of the control unit 20 may be constituted by an electronic circuit including a discrete device.

The storage unit 19 may be constituted by a non-illustrated volatile memory and a non-illustrated non-volatile memory. As the volatile memory, there may be cited, for example, a RAM (Random Access Memory). As the non-volatile memory, there may be cited, for example, a ROM (Read Only Memory), a flash memory, or the like. Data and the like may be stored, for example, in the volatile memory. Programs, tables, maps, and the like may be stored, for example, in the non-volatile memory. At least a portion of the storage unit 19 may be provided in the processor, the integrated circuit, or the like, which were described above.

An input/output interface 21 for realizing a field bus connection is provided in the computer 12. Via the field bus 17, the computer 12 is capable of carrying out communications with the base wireless devices 14.

The base wireless devices 14, and more specifically, master wireless devices, for example, are each equipped with a computation unit (processing unit) 22, and a storage unit 23.

The computation unit 22 may be constituted, for example, by a processor (processing circuitry) such as a CPU or the like. The computation unit 22 is equipped with a control unit 24, a synchronous connection transmission unit 25, a transmission and reception processing unit 26, a state of connection determination unit 27, and a forced disconnection signal transmission unit 28. Although the computation unit 22 may be equipped with constituent elements apart from these constituent elements, in order to simplify the description, constituent elements other than these have been omitted herein. The control unit 24, the synchronous connection transmission unit 25, the transmission and reception processing unit 26, the state of connection determination unit 27, and the forced disconnection signal transmission unit 28 can be realized by programs stored in the storage unit 23 being executed by the computation unit 22. Moreover, it should be noted that at least a portion of the control unit 24, the synchronous connection transmission unit 25, the transmission and reception processing unit 26, the state of connection determination unit 27, and the forced disconnection signal transmission unit 28 may be implemented by an integrated circuit such as an ASIC or an FPGA or the like. Further, at least a portion of the control unit 24, the synchronous connection transmission unit 25, the transmission and reception processing unit 26, the state of connection determination unit 27, and the forced disconnection signal transmission unit 28 may be constituted by an electronic circuit including a discrete device.

The storage unit 23 may be constituted by a non-illustrated volatile memory and a non-illustrated non-volatile memory. As the volatile memory, there may be cited, for example, a RAM. As the non-volatile memory, there may be cited, for example, a ROM, a flash memory, or the like. Data and the like may be stored, for example, in the volatile memory. Programs, tables, maps, and the like may be stored, for example, in the non-volatile memory. At least a portion of the storage unit 23 may be provided in the processor, the integrated circuit, or the like, which were described above.

The base wireless devices 14 are each equipped with an input/output interface 29 for the purpose of realizing a field bus connection. In the manner discussed previously, the base wireless devices 14 may be connected to the computer 12 by the field bus 17.

The base wireless devices 14 are each equipped with a communication unit 30 for the purpose of performing wireless communications. Using the communication unit 30, the base wireless devices 14 may carry out wireless communications with the remote wireless devices 16.

The remote wireless devices 16, and more specifically, slave wireless devices, may be provided in each of a plurality of apparatuses 44 (refer to FIG. 1) that make up the industrial equipment. As such apparatuses 44, there may be cited sensors, valves, and the like, although the present invention is not limited to such devices. The remote wireless devices 16, for example, are each equipped with a computation unit (processing unit) 32, and a storage unit 34.

The computation unit 32 may be constituted by a processor, and more specifically, a processor (processing circuitry) such as a CPU or the like. The computation unit 32 is equipped with a control unit 35, a synchronous connection reception unit 36, a transmission and reception processing unit 37, a reception completion notification transmission unit 38, a forced disconnection signal transmission unit 39, a diagnostic information transmission unit 40, and an electrical power source monitoring unit 41. Although the computation unit 32 may be equipped with constituent elements apart from these constituent elements, in order to simplify the description, constituent elements other than these have been omitted herein. The control unit 35, the synchronous connection reception unit 36, the transmission and reception processing unit 37, and the reception completion notification transmission unit 38 can be realized by programs stored in the storage unit 34 being executed by the computation unit 32. Further, the forced disconnection signal transmission unit 39, the diagnostic information transmission unit 40, and the electrical power source monitoring unit 41 can be realized by programs stored in the storage unit 34 being executed by the computation unit 32. Moreover, it should be noted that at least a portion of the control unit 35, the synchronous connection reception unit 36, the transmission and reception processing unit 37, the reception completion notification transmission unit 38, the forced disconnection signal transmission unit 39, the diagnostic information transmission unit 40, and the electrical power source monitoring unit 41 may be implemented by an integrated circuit such as an ASIC or an FPGA or the like. Further, at least a portion of the control unit 35, the synchronous connection reception unit 36, the transmission and reception processing unit 37, the reception completion notification transmission unit 38, the forced disconnection signal transmission unit 39, the diagnostic information transmission unit 40, and the electrical power source monitoring unit 41 may be constituted by an electronic circuit including a discrete device.

The storage unit 34 may be constituted by a non-illustrated volatile memory and a non-illustrated non-volatile memory. As the volatile memory, there may be cited, for example, a RAM. As the non-volatile memory, there may be cited, for example, a ROM, a flash memory, or the like. Data and the like may be stored, for example, in the volatile memory. Programs, tables, maps, and the like may be stored, for example, in the non-volatile memory. At least a portion of the storage unit 34 may be provided in the processor, the integrated circuit, or the like, which were described above.

The remote wireless devices 16 are each equipped with a communication unit 42 for the purpose of performing wireless communications. Using the communication unit 42, the remote wireless devices 16 may carry out wireless communications with the base wireless devices 14.

Communications may be carried out between one of the base wireless devices 14 and one of the remote wireless devices 16 using a frequency hopping method. More specifically, data can be transmitted and received between one of the base wireless devices 14 and one of the remote wireless devices 16, by switching the hopping frequencies at a predetermined hopping period Tfh. Switching of the hopping frequencies may be carried out on the basis of a predetermined hopping pattern. Since the same hopping pattern is used by the base wireless device 14 and the remote wireless device 16 that are synchronously connected to each other, communication can be carried out while switching the communication frequencies between the base wireless device 14 and the remote wireless device 16. The communication frequencies are the frequencies of a carrier wave. The communication process of the frequency hopping method is administered by the transmission and reception processing unit 26 that is provided in the base wireless device 14, and the transmission and reception processing unit 37 that is provided in each of the remote wireless devices 16. More specifically, the data transmission and reception process in the frequency hopping method is administered by the transmission and reception processing unit 26 that is provided in the base wireless device 14, and the transmission and reception processing unit 37 that is provided in each of the remote wireless devices 16.

For example, a 2.4 GHz band can be used for the wireless communications in the frequency hopping method. Assuming that the minimum frequency is 2403 MHz, the maximum frequency is 2481 MHz, and the frequency band occupied by the respective channels is 1 MHz wide, the number of channels is seventy-nine.

Pairing may already be taking place between the base wireless device 14 and the remote wireless device 16. Even if the base wireless device 14 and the remote wireless device 16 are already paired, if the base wireless device 14 and the remote wireless device 16 are not synchronously connected, communications between the base wireless device 14 and the remote wireless device 16 cannot be carried out using the frequency hopping method. For this reason, prior to performing communications using the frequency hopping method, transmission and reception of a synchronous connection signal in order to carry out the synchronous connection are carried out between the base wireless device 14 and the remote wireless device 16.

In the synchronous connection signal, there may be included identification information of the base wireless device 14, identification information of the remote wireless device 16 to which the synchronous connection signal is to be transmitted, and time information. The identification information of the base wireless device 14, for example, is a product ID of the base wireless device 14, although the present invention is not limited to this feature. The identification information of each of the remote wireless devices 16, for example, is a product ID of each of the remote wireless devices 16, although the present invention is not limited to this feature.

Transmission and reception of the synchronous connection signal in order to carry out the synchronous connection can be performed, for example, in the following situation. For example, when a network 43 that is not yet up and running is started up, a synchronous connection signal is transmitted and received between all of the plurality of remote wireless devices 16 that make up the network 43 and the base wireless device 14. During operation of the network 43, in the case that one of the remote wireless devices 16 becomes placed in a state of being disconnected due to some reason, transmission and reception of the synchronous connection signal between the remote wireless device 16 and the base wireless device 14 can be carried out. The state of being disconnected is a state in which the remote wireless device 16 is not synchronously connected to the base wireless device 14.

As discussed previously, the base wireless devices 14 are each equipped with the synchronous connection transmission unit 25. In the case that at least one of the plurality of remote wireless devices 16 that make up a network 43 is not synchronously connected to the base wireless device 14, the synchronous connection transmission unit 25 provided in the base wireless device 14 performs the following process. More specifically, in such a case, the synchronous connection transmission unit 25 performs a transmission process of transmitting a synchronous connection signal for the purpose of establishing a synchronous connection with the remote wireless device 16 that is not synchronously connected. Such a transmission process can be carried out by broadcasting with respect to the plurality of remote wireless devices 16 that make up the network 43. The concerned transmission process is carried out only at a single sort of synchronous connection period Tsc that is an integral multiple of the hopping period Tfh. More specifically, the concerned transmission process is performed only at a synchronous connection period Tsc that is determined beforehand. Stated otherwise, such a transmission process can be performed at predetermined interruption intervals. The synchronous connection period Tsc, for example, can be set to 250 msec, although the present invention is not limited to this feature.

Moreover, a signal for the purpose of maintaining the synchronous connection may also be transmitted and received between the base wireless device 14 and the remote wireless device 16 that are synchronously connected. Transmission and reception of the signal for the purpose of maintaining the synchronous connection may be carried out over a wireless communication in the frequency hopping method. Transmission and reception of the signal for the purpose of maintaining the synchronous connection can be performed, for example, at a period of 100 msec, although the present invention is not limited to this feature. Time information may be included in the signal for the purpose of maintaining the synchronous connection. Therefore, by transmitting and receiving the signal for the purpose of maintaining the synchronous connection, a difference in time between the time information of the base wireless device 14 and the time information of the remote wireless device 16 can be eliminated.

The transmission of the synchronous connection signal only at the synchronous connection period Tsc is for the purpose of carrying out transmission and reception of data in the frequency hopping method, aside from at the synchronous connection period Tsc, between the remote wireless device 16 and the base wireless device 14 that are already synchronously connected. The synchronous connection signal in order to carry out the synchronous connection is transmitted only at the synchronous connection period Tsc that is determined beforehand, in order to prevent the transmission and reception of data in the frequency hopping method from being hindered.

The synchronous connection transmission unit 25, by sequentially switching the communication frequencies for synchronization, which are frequencies used for synchronization, transmits the synchronous connection signal at the plurality of communication frequencies for synchronization within one hopping period Tfh. When the synchronous connection signal is transmitted, the reason why the plurality of communication frequencies for synchronization are used is as follows. More specifically, this is because, even in the case that the transmission and reception of the synchronous connection signal at a given communication frequency for synchronization is interfered with by radio wave interference or the like, there are cases in which it may be possible to transmit and receive the synchronous connection signal, if another communication frequency for synchronization that is different from such a given communication frequency for synchronization is used. Due to such a reason, when the synchronous connection signal is transmitted, the plurality of communication frequencies for synchronization are used.

As discussed previously, the remote wireless devices 16 are each equipped with the synchronous connection reception unit 36. In the case that a synchronous connection is not established between the remote wireless device 16 and the base wireless device 14, the synchronous connection reception unit 36 carries out a process of waiting for reception of the synchronous connection signal. By sequentially switching the communication frequencies for synchronization at the switching period Tcg that is determined beforehand, the process of waiting for reception of the synchronous connection signal is performed at the plurality of communication frequencies for synchronization. The plurality of communication frequencies for synchronization used when transmitting the synchronous connection signal, and the plurality of communication frequencies for synchronization used during the process of waiting for reception are set in the same manner. For example, in the case that the plurality of communication frequencies for synchronization, which are used when one of the base wireless devices 14 transmits the synchronous connection signal, are f1, f2, and f3, the plurality of communication frequencies for synchronization, which are used when the remote wireless devices 16 are carrying out the process of waiting for reception, are also set to f1, f2, and f3.

When the communication frequency for synchronization that is set when the process of waiting for reception is carried out by the remote wireless device 16 does not coincide with the communication frequency for synchronization used when the synchronous connection signal is transmitted by the base wireless device 14, the concerned synchronous connection signal cannot be received by the remote wireless device 16. When the communication frequency for synchronization that is set when the process of waiting for reception is carried out by the remote wireless device 16 coincides with the communication frequency for synchronization used when the synchronous connection signal is transmitted by the base wireless device 14, the concerned synchronous connection signal can be received by the remote wireless device 16.

Such a switching period Tcg is set to be longer than the hopping period Tfh, and further, to be shorter than a period that is two times the hopping period Tfh. Setting of the switching period Tcg in this manner is done for the following reason. More specifically, when the switching period Tcg is set in this manner, the relative relationship between the timing of the process of transmitting the synchronous connection signal, and the timing of switching the communication frequencies for synchronization of the process of waiting for reception gradually change over the elapse of time. Upon doing so, the communication frequencies for synchronization used in the transmission process and the communication frequencies for synchronization used in the process of waiting for reception rapidly coincide with each other. For this reason, the switching period Tcg is set to be longer than the hopping period Tfh, and further, to be shorter than a period that is two times the hopping period Tfh.

The hopping period Tfh, for example, is less than or equal to 5 msec, although the present invention is not limited to this feature. However, from the standpoint of realizing high-speed communications by the hopping method, it is preferable that the hopping period Tfh be less than or equal to 5 msec. In this instance, a case in which the hopping period Tfh is 5 msec will be described as an example. In the case that the hopping period Tfh is 5 msec, the switching period Tcg can be set, for example, to 6 msec, although the present invention is not limited to this feature.

In the case that the hopping period Tfh is 5 msec, the number of the communication frequencies for synchronization that are used in the transmission process and in the process of waiting for reception, for example, may be three, although the present invention is not limited to this feature. The number of the communication frequencies for synchronization that are used in the transmission process and in the process of waiting for reception, for example, may be two, or may also be four. In this instance, a case will be described as an example, in which the number of the communication frequencies for synchronization that are used in the transmission process and in the process of waiting for reception is three.

When the transmission and reception processing unit 37 receives the synchronous connection signal, the control unit 35 provided in the remote wireless device 16 performs the following process. More specifically, in such a case, on the basis of the information contained in the synchronous connection signal, the control unit 35 determines whether or not the concerned synchronous connection signal is a synchronous connection signal transmitted from the base wireless device 14 to the concerned remote wireless device 16. Specifically, based on the identification information of the base wireless device 14, and the identification information of the concerned remote wireless device 16, the control unit 35 determines whether or not the concerned synchronous connection signal is a synchronous connection signal transmitted from the base wireless device 14 to the concerned remote wireless device 16.

FIG. 3 is a diagram conceptually showing transmission and reception of the synchronous connection signal. The upper-lower direction in FIG. 3 indicates an elapsed time period from a certain timing.

In the foregoing manner, each of the base wireless devices 14 transmits the synchronous connection signal at the synchronous connection period Tsc. FIG. 3 shows an example in which the synchronous connection period Tsc is 250 msec.

As noted previously, the process of transmitting the synchronous connection signal is performed within the hopping period Tfh. FIG. 3 shows an example in which the hopping period Tfh is 5 msec.

As noted previously, in the process of waiting for reception, each of the remote wireless devices 16 switches the communication frequencies for synchronization at the switching period Tcg that is determined beforehand. FIG. 3 shows an example in which the switching period Tcg is 6 msec.

In the example shown in FIG. 3, within one hopping period Tfh, there are transmitted from one of the base wireless devices 14 a synchronous connection signal whose communication frequency for synchronization is f1, a synchronous connection signal whose communication frequency for synchronization is f2, and a synchronous connection signal whose communication frequency for synchronization is f3. Further, in the example shown in FIG. 3, in the hopping period Tfh when the elapsed time period is 0 msec, a transmission process of the synchronous connection signal from the base wireless device 14 is carried out. Further, in the example shown in FIG. 3, in the hopping period Tfh when the elapsed time period is 250 msec, a transmission process of the synchronous connection signal from the base wireless device 14 is carried out. Further, in the example shown in FIG. 3, in the hopping period Tfh when the elapsed time period is 500 msec, a transmission process of the synchronous connection signal from the base wireless device 14 is carried out. In the case that remote wireless device 16 that is not synchronously connected exists, then similarly thereafter as well, for example, each time that 250 msec elapses, although the transmission process of the synchronous connection signal from each of the base wireless devices 14 can be carried out, description of this feature is omitted herein.

In the example shown in FIG. 3, the timing at which switching of the communication frequencies for synchronization in the reception waiting process takes place is staggered by 1 msec mutually between among each of the plurality of the remote wireless devices 16A to 16P. When the remote wireless devices are described in general, the reference numeral 16 is used, whereas, when individual ones of the remote wireless devices 16 are described, the reference numerals 16A through 16P are used. Because the remote wireless devices 16 are not in synchronism with each other, the actual timing at which the switching of the communication frequencies for synchronization takes place in the process of waiting for reception is not necessarily staggered by 1 msec between each of the plurality of the remote wireless devices 16. In this instance, for convenience of description, the timing at which the switching of the communication frequencies for synchronization takes place in the process of waiting for reception is shown, to be staggered by 1 msec mutually between each of the plurality of remote wireless devices 16A to 16P.

In the example shown in FIG. 3, when the elapsed time period is 0 msec, 6 msec, 12 msec . . . , the communication frequencies for synchronization in the reception waiting process are switched by the remote wireless device 16A. In the example shown in FIG. 3, when the elapsed time period is greater than or equal to 0 msec and less than 6 msec, the communication frequency for synchronization in the reception waiting process is set to f1 by the remote wireless device 16A. Further, in the example shown in FIG. 3, when the elapsed time period is greater than or equal to 6 msec and less than 12 msec, the communication frequency for synchronization in the reception waiting process is set to f2 by the remote wireless device 16A. Further, in the example shown in FIG. 3, when the elapsed time period is greater than or equal to 12 msec and less than 18 msec, the communication frequency for synchronization in the reception waiting process is set to f3 by the remote wireless device 16A. In the remote wireless device 16A, until a synchronous connection is established with the base wireless device 14, the communication frequencies for synchronization in the reception waiting process continue to be switched in the same manner as described above in order of the frequencies f1, f2, and f3.

In the example shown in FIG. 3, the timing at which the communication frequencies for synchronization are switched in the remote wireless device 16B in the reception waiting process is delayed by 1 msec with respect to the timing at which the communication frequencies for synchronization are switched in the remote wireless device 16A in the reception waiting process. More specifically, in the example shown in FIG. 3, when the elapsed time period is 1 msec, 7 msec, 13 msec . . . , the communication frequencies for synchronization in the reception waiting process are switched by the remote wireless device 16B in order of the frequencies f1, f2, and f3. In a similar manner to the remote wireless device 16A, in the remote wireless device 16B as well, until a synchronous connection is established with the base wireless device 14, the communication frequencies for synchronization in the reception waiting process continue to be switched in the same manner as described above in order of the frequencies f1, f2, and f3.

As noted previously, in the example shown in FIG. 3, the timing at which switching of the communication frequencies for synchronization in the reception waiting process takes place is staggered by 1 msec mutually among each of the plurality of the remote wireless devices 16A to 16P. In a similar manner to the remote wireless devices 16A and 16B, in the remote wireless devices 16C to 16P as well, until a synchronous connection is established with the base wireless device 14, the communication frequencies for synchronization in the reception waiting process continue to be switched in the same manner as described above in order of the frequencies f1, f2, and f3.

In the hopping period Tfh when the elapsed time period is 0 msec, in the case that the destination of the synchronous connection signal transmitted from the base wireless device 14 is the remote wireless device 16A, then in the example shown in FIG. 3, the following situation occurs. More specifically, in the example shown in FIG. 3, when the elapsed time period is 0 msec, the synchronous connection signal is transmitted from the base wireless device 14 at the communication frequency for synchronization f1. When the elapsed time period is 0 msec, the communication frequency for synchronization in the reception waiting process is set to f1 in the remote wireless device 16A. Accordingly, when the elapsed time period is 0 msec, the synchronous connection signal, which is transmitted from the base wireless device 14 at the communication frequency for synchronization f1, is received in the remote wireless device 16A. In the example shown in FIG. 3, when the elapsed time period is 2 msec, the synchronous connection signal is transmitted from the base wireless device 14 at the communication frequency for synchronization f2. When the elapsed time period is 2 msec, the communication frequency for synchronization in the reception waiting process is set to f1 in the remote wireless device 16A. Accordingly, when the elapsed time period is 2 msec, the synchronous connection signal, which is transmitted from the base wireless device 14 at the communication frequency for synchronization f2, is not received in the remote wireless device 16A. In the example shown in FIG. 3, when the elapsed time period is 4 msec, the synchronous connection signal is transmitted from the base wireless device 14 at the communication frequency for synchronization f3. When the elapsed time period is 4 msec, the communication frequency for synchronization in the reception waiting process is set to f1 in the remote wireless device 16A. Accordingly, when the elapsed time period is 4 msec, the synchronous connection signal, which is transmitted from the base wireless device 14 at the communication frequency for synchronization f3, is not received in the remote wireless device 16A.

In the hopping period Tfh when the elapsed time period is 250 msec, in the case that the destination of the synchronous connection signal transmitted from the base wireless device 14 is the remote wireless device 16K, then in the example shown in FIG. 3, the following situation occurs. More specifically, in the example shown in FIG. 3, when the elapsed time period is 250 msec, the synchronous connection signal is transmitted from the base wireless device 14 at the communication frequency for synchronization f1. When the elapsed time period is 250 msec, the communication frequency for synchronization in the reception waiting process is set to f2 in the remote wireless device 16K. Accordingly, when the elapsed time period is 250 msec, the synchronous connection signal, which is transmitted from the base wireless device 14 at the communication frequency for synchronization f1, is not received in the remote wireless device 16K. In the example shown in FIG. 3, when the elapsed time period is 252 msec, the synchronous connection signal is transmitted from the base wireless device 14 at the communication frequency for synchronization f2. When the elapsed time period is 252 msec, the communication frequency for synchronization in the reception waiting process is set to f2 in the remote wireless device 16K. Accordingly, when the elapsed time period is 252 msec, the synchronous connection signal, which is transmitted from the base wireless device 14 at the communication frequency for synchronization f2, is received in the remote wireless device 16K. In the example shown in FIG. 3, when the elapsed time period is 254 msec, the synchronous connection signal is transmitted from the base wireless device 14 at the communication frequency for synchronization f3. When the elapsed time period is 254 msec, the communication frequency for synchronization in the reception waiting process is set to f2 in the remote wireless device 16K. Accordingly, when the elapsed time period is 254 msec, the synchronous connection signal, which is transmitted from the base wireless device 14 at the communication frequency for synchronization f3, is not received in the remote wireless device 16K.

In the hopping period Tfh when the elapsed time period is 500 msec, in the case that the destination of the synchronous connection signal transmitted from the base wireless device 14 is the remote wireless device 16D, then in the example shown in FIG. 3, the following situation occurs. More specifically, in the example shown in FIG. 3, when the elapsed time period is 500 msec, the synchronous connection signal is transmitted from the base wireless device 14 at the communication frequency for synchronization f1. When the elapsed time period is 500 msec, the communication frequency for synchronization in the reception waiting process is set to f2 in the remote wireless device 16D. Accordingly, when the elapsed time period is 500 msec, the synchronous connection signal, which is transmitted from the base wireless device 14 at the communication frequency for synchronization f1, is not received in the remote wireless device 16D. In the example shown in FIG. 3, when the elapsed time period is 502 msec, the synchronous connection signal is transmitted from the base wireless device 14 at the communication frequency for synchronization f2. When the elapsed time period is 502 msec, the communication frequency for synchronization in the reception waiting process is set to f3 in the remote wireless device 16D. Accordingly, when the elapsed time period is 502 msec, the synchronous connection signal, which is transmitted from the base wireless device 14 at the communication frequency for synchronization f2, is not received in the remote wireless device 16D. In the example shown in FIG. 3, when the elapsed time period is 504 msec, the synchronous connection signal is transmitted from the base wireless device 14 at the communication frequency for synchronization f3. When the elapsed time period is 504 msec, the communication frequency for synchronization in the reception waiting process is set to f3 in the remote wireless device 16D. Accordingly, when the elapsed time period is 504 msec, the synchronous connection signal, which is transmitted from the base wireless device 14 at the communication frequency for synchronization f3, is received in the remote wireless device 16D.

The remote wireless devices 16, as described above, are each equipped with the reception completion notification transmission unit 38. In the case that the synchronous connections signal is received by the synchronous connection reception unit 36, the reception completion notification transmission unit 38 may transmit a reception completion notification Ack to the base wireless device 14, in a subsequent hopping period Tfh after the hopping period Tfh in which the concerned synchronous connection signal was received. More specifically, in the case it is determined by the control unit 35 that the signal is a synchronous connection signal transmitted to the remote wireless device 16, the reception completion notification transmission unit 38 carries out the following process. In such a case, the reception completion notification transmission unit 38 transmits the reception completion notification Ack to the base wireless device 14 in the next hopping period Tfh subsequent to the hopping period Tfh in which the concerned synchronous connection signal was received. Moreover, the transmission and reception of such a reception completion notification Ack may be carried out in the transmission and reception of data in the frequency hopping method. By such a reception completion notification Ack being received by the base wireless device 14, the process of establishing the synchronous connection between the base wireless device 14 and the remote wireless device 16 is completed.

Figure 4:
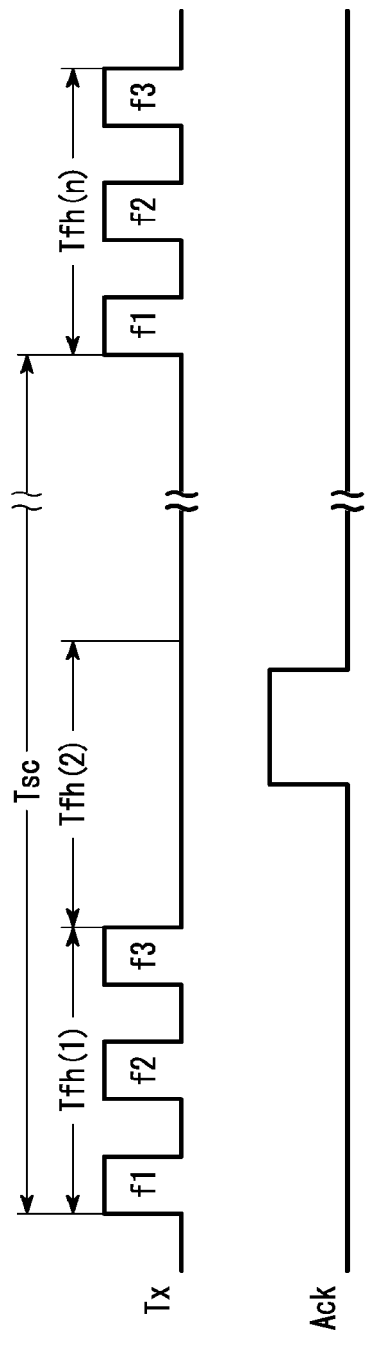
FIG. 4 is a diagram illustrating an example of a time chart.

FIG. 4 is a diagram illustrating an example of a time chart. In FIG. 4, there are shown a synchronous connection signal Tx transmitted from the base wireless device 14, and the reception completion notification Ack transmitted in return from one of the remote wireless devices 16 which serves as a destination of the synchronous connection signal Tx.

As shown in FIG. 4, in the hopping period Tfh(1), the synchronous connection signal is transmitted by switching the communication frequencies for synchronization in order of the frequencies f1, f2, and f3. When the hopping periods are described in general, the reference character Tfh is used, whereas, when individual ones of the hopping periods Tfh are described, the reference characters Tfh(1), Tfh(2), . . . , Tfh(n) are used.

In each of the remote wireless devices 16 that serves as a destination of the synchronous connection signal, when the synchronous connection signal is received, in the next hopping period Tfh(2) subsequent to the hopping period Tfh(1), the reception completion notification Ack is transmitted in return from the concerned remote wireless device 16.

As noted previously, in the case that a 2.4 GHz band is used for the wireless communications in the frequency hopping method, the number of channels, for example, is seventy-nine. Because the number of channels, and more specifically, the number of the communication frequencies for synchronization is limited, for example, to seventy-nine, the following situation can occur in the industrial wireless communication system 10 equipped with a large number of the base wireless devices 14. More specifically, a situation can occur in which a combination of the plurality of the communication frequencies for synchronization, which are used when transmitting the synchronous connection signal, coincide with each other between one of the base wireless devices 14 and another of the base wireless devices 14. In the case that the plurality of the communication frequencies for synchronization, which are used in the process of transmitting the synchronous connection signals coincide with each other in one of the base wireless devices 14 and another of the base wireless devices 14, the possibility is increased that the transmission of the synchronous connection signals will be hindered by radio wave interference. In such a case, by making the switching orders of the plurality of the communication frequencies for synchronization different from each other among these base wireless devices 14. Hindering of the transmission of the synchronous connection signals by radio wave interference is suppressed.

FIG. 5A and FIG. 5B are time charts showing an example of a switching procedure of communication frequencies for synchronization. FIG. 5A shows an example of the present embodiment. More specifically, FIG. 5A shows an example in which the switching orders of a plurality of the communication frequencies for synchronization are made different from each other. FIG. 5B shows an example of a comparative example. More specifically, FIG. 5B shows an example in which the switching orders of a plurality of the communication frequencies for synchronization are set to be the same as each other. An example of a case is shown in FIG. 5A and FIG. 5B, in which a synchronous connection period Tsc1 in one of the base wireless devices 14, and a synchronous connection period Tsc2 in another of the base wireless devices 14 overlap with each other. In the examples shown in FIG. 5A and FIG. 5B, the combination of the plurality of the communication frequencies for synchronization, which are used when transmitting the synchronous connection signals, are set to f1, f2, and f3 in one of the base wireless devices 14, as well as in the other of the base wireless devices 14. Tx1 in FIG. 5A and FIG. 5B indicates the synchronous connection signal transmitted from one of the base wireless devices 14. Tx2 in FIG. 5A and FIG. 5B indicates a synchronous connection signal transmitted from the other of the base wireless devices 14.

As shown in FIG. 5B, in the case of a comparative example, when transmitting the synchronous connection signal, one of the base wireless devices 14 switches the communication frequencies for synchronization in order of the frequencies f1, f2, and f3. The other of the base wireless devices 14, when transmitting the synchronous connection signal, also switches the communication frequencies for synchronization in order of the frequencies f1, f2, and f3. In the case that the communication frequencies for synchronization are switched in this order, in the case that the synchronous connection period Tsc1 in one of the base wireless devices 14, and the synchronous connection period Tsc2 in the other of the base wireless devices 14 overlap with each other, the following situation occurs. More specifically, when the synchronous connection signal is transmitted at the communication frequency for synchronization f1 from the one of the base wireless devices 14, the synchronous connection signal is transmitted at the communication frequency for synchronization f1 from the other of the base wireless devices 14. Since the synchronous communication frequencies are the same when transmitting the synchronous connection signals, radio wave interference disadvantageously occurs when the synchronous connection signals are transmitted at the synchronous communication frequency f1. Further, when the synchronous connection signal is transmitted at the communication frequency for synchronization f2 from the one of the base wireless devices 14, the synchronous connection signal is transmitted at the communication frequency for synchronization f2 from the other of the base wireless devices 14. Since the synchronous communication frequencies are the same when transmitting the synchronous connection signals, radio wave interference disadvantageously occurs also when the synchronous connection signals are transmitted at the synchronous communication frequency f2. Further, when the synchronous connection signal is transmitted at the communication frequency for synchronization f3 from the one of the base wireless devices 14, the synchronous connection signal is transmitted at the communication frequency for synchronization f3 from the other of the base wireless devices 14. Since the synchronous communication frequencies are the same when transmitting the synchronous connection signals, radio wave interference disadvantageously occurs also when the synchronous connection signals are transmitted at the synchronous communication frequency f3.

In contrast thereto, according to the present embodiment, as shown in FIG. 5A, when transmitting the synchronous connection signal, one of the base wireless devices 14 switches the communication frequencies for synchronization in order of the frequencies f1, f2, and f3. Further, according to the present embodiment, as shown in FIG. 5A, when transmitting the synchronous connection signal, the other of the base wireless devices 14 switches the communication frequencies for synchronization in order of the frequencies f3, f2, and f1. In the case that the communication frequencies for synchronization are switched in this order, even if the synchronous connection period Tsc1 in one of the base wireless devices 14, and the synchronous connection period Tsc2 in the other of the base wireless devices 14 overlap with each other, the following situation occurs. More specifically, when the synchronous connection signal is transmitted at the communication frequency for synchronization f1 from the one of the base wireless devices 14, the synchronous connection signal is transmitted at the communication frequency for synchronization f3 from the other of the base wireless devices 14. Since the communication frequencies for synchronization when transmitting the synchronous connection signals differ from each other, radio wave interference does not occur between them. Further, when the synchronous connection signal is transmitted at the communication frequency for synchronization f3 from the one of the base wireless devices 14, the synchronous connection signal is transmitted at the communication frequency for synchronization f1 from the other of the base wireless devices 14. Since the communication frequencies for synchronization when transmitting the synchronous connection signals differ from each other, radio wave interference does not occur between them. Radio wave interference occurs only when the synchronous connection signals are transmitted from the one of the base wireless devices 14 and the other of the base wireless devices 14 at the communication frequency for synchronization f2.

In this manner, according to the present embodiment, in the case that the combination of the plurality of communication frequencies for synchronization, which are used when transmitting the synchronization connection signals, coincide with each other among a plurality of the base wireless devices 14, the switching orders of the plurality of the communication frequencies for synchronization are made different from each other among these base wireless devices 14. By doing so, it is possible to prevent the transmission of the synchronous connection signals from being hindered by radio wave interference.

There may be cases in which the electrical power sources of the remote wireless devices 16 that were synchronously connected are turned OFF. Whether or not the remote wireless devices 16 are in a state of being disconnected can be determined, for example, in the following manner. More specifically, in the case that one of the base wireless devices 14 and one of the remote wireless devices 16 are in a state of being synchronously connected, data indicating that the remote wireless device 16 is in a state of being connected is transmitted from the remote wireless device 16 to the base wireless device 14, for example, every two seconds. In the case that the concerned remote wireless device 16 is in a state of being disconnected, data indicating that the remote wireless device 16 is in a state of being connected is not transmitted from the remote wireless device 16 to the base wireless device 14. According to the present embodiment, regardless of the fact that the elapsed time period from the timing at which the data was received has reached the time threshold value TTH, in the case that data is not newly received from the concerned remote wireless device 16, the following process is carried out. More specifically, the state of connection determination unit 27 determines that the concerned remote wireless device 16 is in a state of being disconnected. The time threshold value TTH, for example, may be 5 seconds, although the present invention is not limited to this feature. In the foregoing manner, according to the present embodiment, based on the fact that the time period during which data is not received from the remote wireless device 16 with which a synchronous connection were established has reached the time threshold value TTH, it is determined that the remote wireless device 16 is in a state of being disconnected. Therefore, according to the present embodiment, in the case that the electrical power source of the remote wireless device 16 is turned OFF, it can be accurately determined that the remote wireless device 16 is in a state of being disconnected. Moreover, the diagnostic information described below, which is information indicating whether or not an abnormality is occurring in the apparatus 44 in which the remote wireless device 16 is provided, may be transmitted together with data indicating whether the remote wireless device 16 is in a state of being connected.

Figure 6:
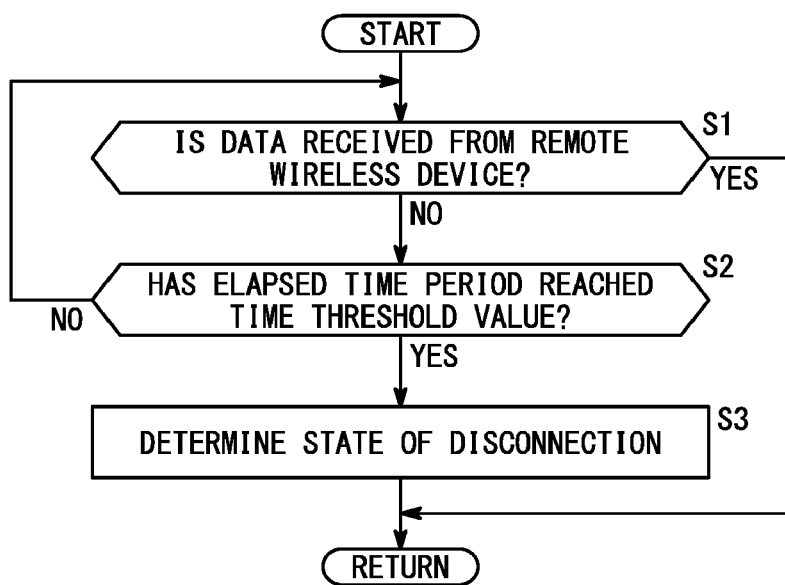
FIG. 6 is a diagram showing an example of operations of the industrial wireless communication system according to the embodiment.

FIG. 6 is a diagram showing an example of operations of the industrial wireless communication system according to the present embodiment. FIG. 6 shows an example, in which, based on the fact that the time period during which data is not received from one of the remote wireless devices 16 has reached the time threshold value TTH, it is determined that the remote wireless device 16 is in a state of being disconnected.

In step S1, the state of connection determination unit 27 determines whether or not the base wireless device 14 has received data from the remote wireless device 16. In the case that the base wireless device 14 has received the data from the remote wireless device 16 (YES in step S1), the process shown in FIG. 6 is brought to an end. In the case that the base wireless device 14 has not received the data from the remote wireless device 16 (NO in step S1), the process transitions to step S2.

In step S2, the state of connection determination unit 27 determines whether or not the elapsed time period from the timing of having received the data from the remote wireless device 16 has reached the time threshold value TTH. In the case that the elapsed time period from the timing of having received the data from the remote wireless device 16 has reached the time threshold value TTH (YES in step S2), the process transitions to step S3. In the case that the elapsed time period from the timing of having received the data from the remote wireless device 16 has not reached the time threshold value TTH (NO in step S2), the processes of step S1 and thereafter are repeated.

In step S3, the state of connection determination unit 27 determines that the remote wireless device 16 is in a state of being disconnected. In this manner, the process shown in FIG. 6 is brought to an end.

The determination as to whether or not the remote wireless device 16 is in a state of being disconnected may be determined in the following manner. More specifically, regardless of the fact that data is transmitted from the base wireless device 14 to the remote wireless device 16, in the case that the reception completion notification Ack is not transmitted from the concerned remote wireless device 16, the base wireless device 14 carry out the following process. In such a case, the base wireless device 14 retransmits the data to the remote wireless device 16. Stated otherwise, in such a case, the base wireless device 14 retries the transmission. Even in the case that the reception completion notification Ack from the remote wireless device 16 is not received, the base wireless device 14 retransmits the data until the number of times threshold value NTH has been reached. According to the present embodiment, regardless of the fact that the number of repetitions that data is transmitted has reached the number of times threshold value NTH, in the case that the reception completion notification Ack from the remote wireless device 16 is not received, a determination is made by the state of connection determination unit 27 that the concerned remote wireless device 16 is in a state of being disconnected. The number of times threshold value NTH, for example, may be thirty-two times, although the present invention is not limited to this feature. In the foregoing manner, regardless of the fact that the number of repetitions that data is transmitted to the remote wireless device 16 with which the synchronous connection was established has reached the number of times threshold value NTH, based on the fact that the reception completion notification Ack has not been received, a determination may be made that the remote wireless device 16 is in a state of being disconnected.

Figure 7:
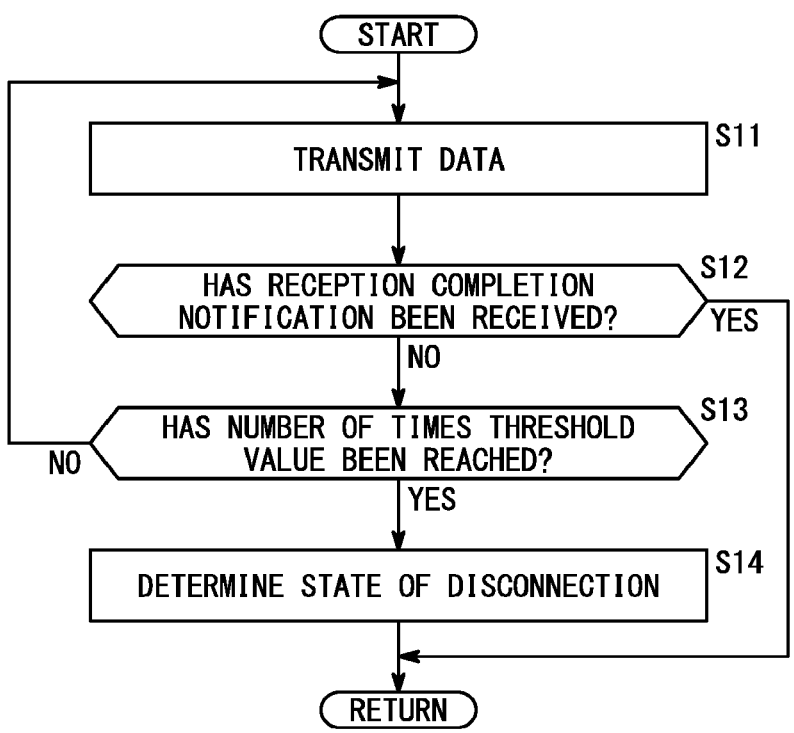
FIG. 7 is a diagram showing an example of operations of the industrial wireless communication system according to the embodiment.

FIG. 7 is a configuration diagram showing one exemplary embodiment of an industrial wireless communication system according to the present embodiment. FIG. 7 shows an example in which, based on the fact that the number of repetitions that data is transmitted to one of the remote wireless devices 16 has reached the number of times threshold value NTH, it is determined that the remote wireless device 16 is in a state of being disconnected.

In step S11, the transmission and reception processing unit 26 transmits data to the remote wireless device 16 using a frequency hopping method. Thereafter, the process transitions to step S12.

In step S12, the state of connection determination unit 27 determines whether or not the reception completion notification Ack from the remote wireless device 16 has been received by the transmission and reception processing unit 26. In the case that the reception completion notification Ack from the remote wireless device 16 has been received by the transmission and reception processing unit 26 (YES in step S12), the process shown in FIG. 7 is brought to an end. In the case that the reception completion notification Ack from the remote wireless device 16 has not been received by the transmission and reception processing unit 26 (NO in step S12), the process transitions to step S13.

In step S13, the state of connection determination unit 27 determines whether or not the number of repetitions of the data that is transmitted to the concerned remote wireless device 16 has reached the number of times threshold value NTH. In the case that the number of repetitions of the data that is transmitted to the concerned remote wireless device 16 has not reached the number of times threshold value NTH (NO in step S13), the processes of step S11 and thereafter are repeated. In the case that the number of repetitions of the data that is transmitted to the concerned remote wireless device 16 has reached the number of times threshold value NTH (YES in step S13), the process transitions to step S14.

In step S14, the state of connection determination unit 27 determines that the remote wireless device 16 is in a state of being disconnected. In this manner, the process shown in FIG. 7 is brought to an end.

The base wireless devices 14 are each equipped with a function of forcibly disconnecting the state of connection with any of the remote wireless devices 16 that are synchronously connected. More specifically, as discussed previously, the base wireless devices 14 are each equipped with the forced disconnection signal transmission unit 28. The forced disconnection signal transmission unit 28 is capable of transmitting to one of the remote wireless devices 16 a forced disconnection signal for the purpose of forcibly disconnecting the connection with the one of the remote wireless devices 16 with which it is synchronously connected. In the case that the forced disconnection signal is transmitted to the one of the remote wireless devices 16 by the forced disconnection signal transmission unit 28, the state of connection determination unit 27 provided in the base wireless device 14 can determine that the one of the remote wireless devices 16 is in a state of being disconnected.

Figure 8:
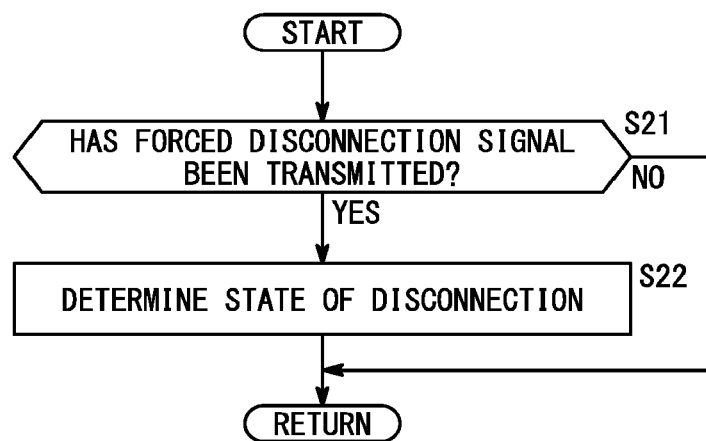
FIG. 8 is a diagram showing an example of operations of the industrial wireless communication system according to the embodiment.

FIG. 8 is a configuration diagram showing one exemplary embodiment of an industrial wireless communication system according to the present embodiment. FIG. 8 shows an example in which, in the event that a forced disconnection signal is transmitted to the remote wireless device 16 by the forced disconnection signal transmission unit 28, it is determined that the remote wireless device 16 is in a state of being disconnected.

In step S21, the state of connection determination unit 27 determines whether or not a forced disconnection signal has been transmitted by the forced disconnection signal transmission unit 28 to one of the remote wireless devices 16. In the case that the forced disconnection signal has been transmitted by the forced disconnection signal transmission unit 28 to the remote wireless device 16 (YES in step S21), the process transitions to step S22. In the case that the forced disconnection signal has not been transmitted by the forced disconnection signal transmission unit 28 to the remote wireless device 16 (NO in step S21), the process shown in FIG. 8 is brought to an end.

In step S22, the state of connection determination unit 27 determines that the concerned remote wireless device 16 is in a state of being disconnected. In this manner, the process shown in FIG. 8 is brought to an end.

The remote wireless devices 16 are each equipped with a function of forcibly disconnecting the state of connection with the base wireless devices 14 that are synchronously connected. More specifically, as discussed previously, the remote wireless devices 16 are each equipped with the forced disconnection signal transmission unit 39, and the electrical power source monitoring unit 41. The forced disconnection signal transmission unit 39 of one of the remote wireless devices 16 is capable of transmitting to one of the base wireless devices 14 a forced disconnection signal for the purpose of forcibly disconnecting the synchronous connection between the one of the remote wireless devices 16 and the one of the base wireless devices 14. For example, in the case that the voltage of the electrical power source as monitored by the electrical power source monitoring unit 41 has become less than a voltage threshold value, the forced disconnection signal transmission unit 39 transmits the forced disconnection signal for the purpose of forcibly disconnecting the synchronous connection with the base wireless device 14. In the case that the forced disconnection signal is transmitted from the remote wireless device 16, the state of connection determination unit 27 provided in the base wireless device 14 is capable of determining that the concerned remote wireless device 16 is in a state of being disconnected.

Moreover, an example has been described herein of a case in which the forced disconnection signal is transmitted from the remote wireless device 16, in the case that the voltage of the electrical power source which is monitored by the electrical power source monitoring unit 41 has become less than the voltage threshold value, however, the present invention is not limited to this feature. In the case it is desired to establish a synchronous connection with another one of the base wireless devices 14 that differs from the one of the base wireless devices 14 that is currently synchronously connected, a signal may be transmitted from the remote wireless device 16 to that one of the base wireless devices 14.

Figure 9:
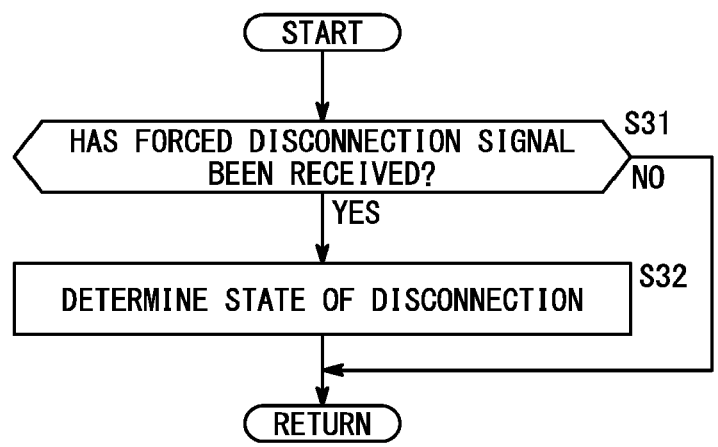
FIG. 9 is a diagram showing an example of operations of the industrial wireless communication system according to the embodiment.

FIG. 9 is a configuration diagram showing one exemplary embodiment of an industrial wireless communication system according to the present embodiment. FIG. 9 shows an example in which, in the event that the forced disconnection signal is received from the remote wireless device 16, it is determined that the remote wireless device 16 is in a state of being disconnected.

In step S31, the state of connection determination unit 27 determines whether or not the transmission and reception processing unit 26 has received the forced disconnection signal from the remote wireless device 16. In the case that the forced disconnection signal is received by the transmission and reception processing unit 26 (YES in step S31), the process transitions to step S32. In the case that the forced disconnection signal has not been received by the transmission and reception processing unit 26 (NO in step S31), the process shown in FIG. 9 is brought to an end.

In step S32, the state of connection determination unit 27 determines that the concerned remote wireless device 16 is in a state of being disconnected. In this manner, the process shown in FIG. 9 is brought to an end.

In the case that the connection with one of the remote wireless devices 16 that was synchronously connected is disconnected, the base wireless device 14 carries out a process of transmitting the synchronous connection signal in order to reestablish a synchronous connection with the concerned remote wireless device 16. More specifically, the synchronous connection transmission unit 25 provided in the base wireless device 14 performs the following process, in the case that the connection with the remote wireless device 16 with which the synchronous connection was established is disconnected. In such a case, the synchronous connection transmission unit 25 carries out the transmission process, by broadcasting, of transmitting the synchronous connection signal at the synchronous connection period Tsc for the purpose of reestablishing the synchronous connection with the remote wireless device 16 that was synchronously connected.

Figure 10:
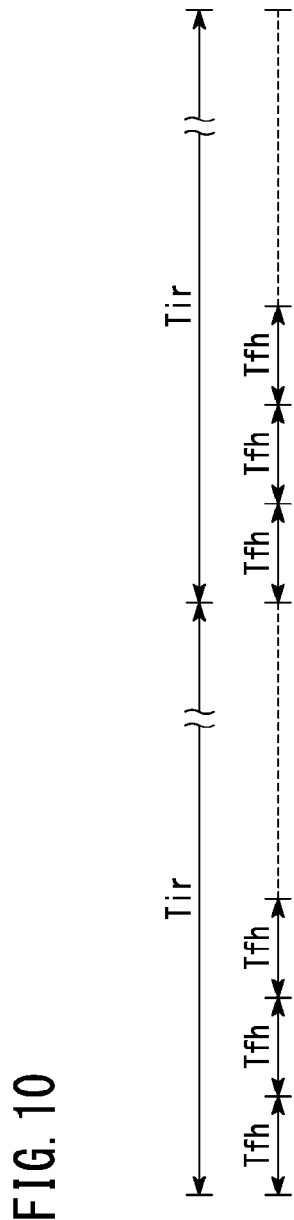
FIG. 10 is a time chart showing an example of an interruption period Tir.

As discussed previously, the remote wireless devices 16 are each equipped with the diagnostic information transmission unit 40. The diagnostic information transmission unit 40 may transmit to the base wireless device 14 diagnostic information of the apparatus 44 in which the remote wireless device 16 is provided. As the diagnostic information, there may be cited, for example, information indicating whether or not an abnormality is occurring in the apparatus 44 in which the remote wireless device 16 is provided. Transmission and reception of the concerned diagnostic information may be carried out in the transmission and reception of data in the frequency hopping method. Transmission and reception of the diagnostic information may be carried out in the transmission and reception of data in the frequency hopping method, and together therewith, may also be performed at a predetermined interruption period Tir. FIG. 10 is a time chart showing an example of the interruption period Tir. The interruption period Tir can be, for example, 500 msec, although the present invention is not limited to this feature.

In the foregoing manner, the synchronous connection signal for the purpose of synchronous connection with the remote wireless devices 16 are broadcast from each of the base wireless devices 14 to the remote wireless devices 16 only at a single sort of synchronous connection period Tsc that is an integral multiple of the hopping period Tfh. In the process of transmitting the synchronous connection signal, by sequentially switching the communication frequencies for synchronization, the synchronous connection signal is transmitted at the plurality of communication frequencies for synchronization within one hopping period Tfh. Further, in the present embodiment, by sequentially switching the communication frequencies for synchronization at the switching period Tcg that is longer than the hopping period Tfh, and is shorter than a period that is two times the hopping period Tfh, the process of waiting for reception of the synchronous connection signal is performed at a plurality of the communication frequencies for synchronization. Therefore, according to the present invention, the industrial wireless communication system 10 can be provided, which is capable of rapidly establishing a synchronous connection.

Modified Embodiment

Although a preferred embodiment of the present invention has been described above, the present invention is not limited to the above-described embodiment, and various modifications thereto are possible within a range that does not depart from the essence and gist of the present invention.

For example, according to the above-described embodiment, a case in which the hopping period Tfh is 5 msec has been described as an example, however, the present invention is not limited to this feature. The hopping period Tfh, for example, may be 2 msec. In this case, the number of the communication frequencies for synchronization that are used in the transmission process and in the process of waiting for reception, for example, may be two, although the present invention is not limited to this feature. The number of the communication frequencies for synchronization that are used in the transmission process and in the process of waiting for reception, for example, may be three, although the present invention is not limited to this feature. In the case that the hopping period Tfh, for example, is 2 msec, the synchronous connection reception unit 36 is capable of sequentially switching the communication frequencies for synchronization at a period, for example, of 3 msec, although the present invention is not limited to this feature.

The above-described embodiments can be summarized in the following manner.

The industrial wireless communication system (10) includes the computer (12) configured to carry out the monitoring control of the industrial equipment, the base wireless device (14) connected by the field bus (17) to the computer, and the plurality of remote wireless devices (16) provided in each of the plurality of apparatuses (44) that make up the industrial equipment, and configured to perform wireless communications with the base wireless device, wherein the base wireless device and the remote wireless devices, which are configured to be synchronously connected, switch the hopping frequency at the predetermined hopping period (Tfh) to thereby carry out transmission and reception of data, the base wireless device includes the synchronous connection transmission unit (25) which, in the case that the synchronous connection with any of the remote wireless devices is not established, is configured to carry out the transmission process, by broadcasting, of transmitting the synchronous connection signal for the purpose of synchronous connection with the remote wireless device only at the single sort of synchronous connection period (Tsc) that is an integer multiple of the hopping period, the synchronous connection transmission unit, by sequentially switching the communication frequencies for synchronization (f1, f2, f3), which are frequencies used for synchronous communication, transmits the synchronous connection signal at the plurality of the communication frequencies for synchronization within one of the hopping periods, and the remote wireless devices each include the synchronous connection reception unit (36) which, in the case that the synchronous connection with the base wireless device is not established, is configured to carry out the process of waiting for reception of the synchronous connection signal at the plurality of the communication frequencies for synchronization, and by sequentially switching the communication frequencies for synchronization at the switching period (Tcg) that is longer than the hopping period, and is shorter than a period that is two times the hopping period. In accordance with such a configuration, the synchronous connection signal for the purpose of synchronous connection with respect to the remote wireless devices is broadcast from the base wireless device to the remote wireless devices only at a single sort of synchronous connection period that is an integral multiple of the hopping period. In the process of transmitting the synchronous connection signal, by sequentially switching the communication frequencies for synchronization, the synchronous connection signal is transmitted at the plurality of communication frequencies for synchronization within one hopping period. Further, by sequentially switching the communication frequencies for synchronization at the switching period that is longer than the hopping period, and further, is shorter than a period that is two times the hopping period, the process of waiting for reception of the synchronous connection signal is performed at a plurality of the communication frequencies for synchronization. Therefore, the industrial wireless communication system can be provided, which is capable of rapidly establishing a synchronous connection.

The base wireless device may include a plurality of the base wireless devices, and the plurality of networks (43) may be constituted, in each of which the plurality of remote wireless devices are synchronously connected to each of the base wireless devices.

The synchronous connection period may be less than or equal to 250 msec.

The hopping period may be less than or equal to 5 msec.

The hopping period may be 5 msec, and the number of the plurality of communication frequencies for synchronization used in the transmission process and in the process of waiting for reception may be any one of two to four.

The synchronous connection reception unit may sequentially switch the communication frequencies for synchronization at a period of 6 msec.

The hopping period may be 2 msec, and the number of the plurality of communication frequencies for synchronization used in the transmission process and in the process of waiting for reception may be two or three.

The synchronous connection reception unit may sequentially switch the communication frequencies for synchronization at a period of 3 msec.

The synchronous connection signal may include identification information of the base wireless device, identification information of the remote wireless device that serves as the object to be synchronously connected, and time information.

The remote wireless devices may each further include the reception completion notification transmission unit (38) which, in the case that the synchronous connection signal is received by the synchronous connection reception unit, may be configured to transmit the reception completion notification (Ack) to the base wireless device, in a subsequent hopping period following the hopping period in which the synchronous connection signal was received.

The switching orders of the plurality of communication frequencies for synchronization may be made different from each other, among the plurality of the base wireless devices in which combinations of the plurality of the communication frequencies for synchronization used in the transmission process coincide with each other. In accordance with such a configuration, it is possible to prevent the transmission of the synchronous connection signals from being hindered by radio wave interference.

The base wireless device may further include the state of connection determination unit (27) configured to determine that one of the remote wireless devices is disconnected, based on the fact that the time period during which data is not being received from the one of the remote wireless devices to which the synchronous connection was established has reached the predetermined time threshold value (TTH). In accordance with such a configuration, it is possible to accurately determine that the remote wireless devices each have been placed in a state of being disconnected.

The base wireless device may further include the state of connection determination unit configured to determine that one of the remote wireless devices is in a state of being disconnected, based on the fact that the reception completion notification from one of the remote wireless devices is not received, regardless of the fact that the number of repetitions that data is transmitted to the one of the remote wireless devices to which the synchronous connection has was established has reached the number of times threshold value (NTH). In accordance with such a configuration, it is possible to accurately determine that the remote wireless devices each have been placed in a state of being disconnected.

The base wireless device may further include the forced disconnection signal transmission unit (28) configured to transmit to one of the remote wireless devices the forced disconnection signal in order to forcibly disconnect the connection with the one of the remote wireless devices with which the synchronous connection has been established, and the state of connection determination unit configured to determine that one of the remote wireless devices is in a state of being disconnected, in the case that the forced disconnection signal is transmitted to the one of the remote wireless devices by the forced disconnection signal transmission unit. In accordance with such a configuration, it is possible to forcibly disconnect the synchronous connection with the remote wireless devices, together with accurately determining that the remote wireless devices each have been placed in a state of being disconnected.

The remote wireless devices may each further include the forced disconnection signal transmission unit (39) configured to transmit to the base wireless device the forced disconnection signal in order to forcibly disconnect the connection with the base wireless device with which the synchronous connection has been established, and the base wireless device may further include the state of connection determination unit configured to determine that one of the remote wireless devices is in a state of being disconnected, in the case that the forced disconnection signal is received from the one of the remote wireless devices. In accordance with such a configuration, the synchronous connection with the base wireless device can be forcibly disconnected from the side of the remote wireless devices, together with accurately determining on the side of the base wireless device that the remote wireless devices each have been placed in a state of being disconnected.

In the case that the connection with the remote wireless device to which the synchronous connection was established is disconnected, the synchronous connection transmission unit may be configured to carry out the transmission process, by broadcasting, of transmitting at the synchronous connection period the synchronous connection signal in order to reestablish the synchronous connection with the remote wireless device to which the synchronous connection was established. In accordance with such a configuration, the synchronous connection can be rapidly restarted.

The remote wireless devices may each further include the diagnostic information transmission unit (40) configured to transmit to the base wireless device, during the transmission and reception of data performed by switching the hopping frequency at the hopping period, diagnostic information of each of the apparatuses in which the remote wireless devices are provided. In accordance with such a configuration, the diagnostic information can be rapidly communicated from the remote wireless devices to the base wireless device.

The invention claimed is:

1. An industrial wireless communication system, comprising:
   a computer configured to carry out a monitoring control of industrial equipment;
   a base wireless device connected by a field bus to the computer; and
   a plurality of remote wireless devices provided in each of a plurality of apparatuses that make up the industrial equipment, and configured to perform wireless communications with the base wireless device,
   wherein the base wireless device and the remote wireless devices, which are configured to be synchronously connected, switch a hopping frequency at a predetermined hopping period to thereby carry out transmission and reception of data;
   the base wireless device includes a synchronous connection transmitter which, in a case that a synchronous connection with any of the remote wireless devices is not established, is configured to carry out a transmission process, by broadcasting, of transmitting a synchronous connection signal for a purpose of synchronous connection with the remote wireless devices only at a single essentially synchronous connection period that is an integer multiple of the predetermined hopping period;

the synchronous connection transmitter, by sequentially switching communication frequencies for synchronization, which are frequencies used for synchronous communication, transmits the synchronous connection signal at the plurality of communication frequencies for synchronization within the predetermined hopping period; and the remote wireless devices each include a synchronous connection receiver which, in a case that a synchronous connection with the base wireless device is not established, is configured to carry out a process of waiting for reception of the synchronous connection signal at the plurality of communication frequencies for synchronization, and by sequentially switching the communication frequencies for synchronization at a switching period that is longer than the predetermined hopping period, and is shorter than a period that is two times the predetermined hopping period.

2. The industrial wireless communication system according to claim 1, wherein the base wireless device includes a plurality of base wireless devices, and a plurality of networks are constituted, in each of which the plurality of remote wireless devices are synchronously connected to each of the base wireless devices.

3. The industrial wireless communication system according to claim 1, wherein the synchronous connection period is less than or equal to 250 milliseconds.

4. The industrial wireless communication system according to claim 1, wherein the predetermined hopping period is less than or equal to 5 milliseconds.

5. The industrial wireless communication system according to claim 4, wherein:

the predetermined hopping period is 5 milliseconds; and a number of the plurality of communication frequencies for synchronization used in the transmission process and in the process of waiting for reception is any one of two to four.

6. The industrial wireless communication system according to claim 5, wherein the synchronous connection receiver sequentially switches the communication frequencies for synchronization at a period of 6 milliseconds.

7. The industrial wireless communication system according to claim 4, wherein:

the predetermined hopping period is 2 milliseconds; and a number of the plurality of communication frequencies for synchronization used in the transmission process and in the process of waiting for reception is two or three.

8. The industrial wireless communication system according to claim 7, wherein the synchronous connection receiver sequentially switches the communication frequencies for synchronization at a period of 3 milliseconds.

9. The industrial wireless communication system according to claim 1, wherein the synchronous connection signal includes identification information of the base wireless device, identification information of the remote wireless devices that serve as objects to be synchronously connected, and time information.

10. The industrial wireless communication system according to claim 1, wherein the remote wireless devices each further comprise a reception completion notification transmitter which, in a case that the synchronous connection signal is received by the synchronous connection receiver, is configured to transmit a reception completion notification to the base wireless device, in a subsequent hopping period following the predetermined hopping period in which the synchronous connection signal was received.

11. The industrial wireless communication system according to claim 2, wherein switching orders of the plurality of communication frequencies for synchronization are made different from each other, among a plurality of the base wireless devices in which combinations of the plurality of the communication frequencies for synchronization used in the transmission process coincide with each other.

12. The industrial wireless communication system according to claim 1, wherein the base wireless device further comprises a state of connection discriminator configured to determine that one of the remote wireless devices is disconnected, based on a fact that a time period during which data is not being received from the one of the remote wireless devices to which a synchronous connection was established has reached a predetermined time threshold value.

13. The industrial wireless communication system according to claim 1, wherein the base wireless device further comprises a state of connection discriminator configured to determine that one of the remote wireless devices is in a state of being disconnected, based on a fact that a reception completion notification from the one of the remote wireless devices is not received, regardless of a fact that a number of repetitions that data is transmitted to the one of the remote wireless devices to which a synchronous connection was established has reached a number of times threshold value.

14. The industrial wireless communication system according to claim 1, wherein the base wireless device further comprises:

a forced disconnection signal transmitter configured to transmit to one of the remote wireless devices a forced disconnection signal in order to forcibly disconnect a connection with the one of the remote wireless devices with which the synchronous connection has been established; and a state of connection discriminator configured to determine that the one of the remote wireless devices is in a state of being disconnected, in a case that the forced disconnection signal is transmitted to the one of the remote wireless devices by the forced disconnection signal transmitter.

15. The industrial wireless communication system according to claim 1, wherein:

the remote wireless devices each further comprises a forced disconnection signal transmitter configured to transmit to the base wireless device a forced disconnection signal in order to forcibly disconnect a connection with the base wireless device with which the synchronous connection has been established; and the base wireless device further comprises a state of connection discriminator configured to determine that one of the remote wireless devices is in a state of being disconnected, in a case that the forced disconnection signal is received from the one of the remote wireless devices.

16. The industrial wireless communication system according to claim 1, wherein, in a case that a connection with one of the remote wireless devices to which the synchronous connection was established is disconnected, the synchronous connection transmitter is configured to carry out the transmission process, by broadcasting, of transmitting at the synchronous connection period the synchronous connection signal in order to reestablish the synchronous connection with the remote wireless device to which the synchronous connection was disconnected.

17. The industrial wireless communication system according to claim 1, wherein the remote wireless devices each further comprises a diagnostic information transmitter configured to transmit to the base wireless device, during transmission and reception of data performed by switching the hopping frequency at the predetermined hopping period, diagnostic information of each of the apparatuses in which the remote wireless devices are provided.

* * * * *